(12) United States Patent
Toguyeni et al.

(10) Patent No.: US 10,010,970 B2
(45) Date of Patent: Jul. 3, 2018

(54) FABRICATION OF PIPE STRINGS USING FRICTION STIR WELDING

(71) Applicant: Acergy France SAS, Suresnes (FR)

(72) Inventors: Gregory Alexandre Toguyeni, La Garenne-Colombes (FR); Cesar Atin, Nanterre (FR); Jacques Lacome, Sucy en Brie (FR)

(73) Assignee: Acergy France SAS, Suresnes (FR)

( * ) Notice: Subject to any disclaimer, the term of this patent is extended or adjusted under 35 U.S.C. 154(b) by 61 days.

(21) Appl. No.: 15/310,776

(22) PCT Filed: May 13, 2015

(86) PCT No.: PCT/IB2015/000959
§ 371 (c)(1),
(2) Date: Nov. 13, 2016

(87) PCT Pub. No.: WO2015/173641
PCT Pub. Date: Nov. 19, 2015

(65) Prior Publication Data
US 2017/0080518 A1 Mar. 23, 2017

(30) Foreign Application Priority Data
May 14, 2014 (GB) .................................. 1408579.9

(51) Int. Cl.
B23K 20/12 (2006.01)
B23K 20/22 (2006.01)
(Continued)

(52) U.S. Cl.
CPC .......... B23K 20/129 (2013.01); B23K 20/126 (2013.01); B23K 20/1245 (2013.01);
(Continued)

(58) Field of Classification Search
CPC ............ B23K 37/0276; B23K 37/0533; B23K 37/0282; B23K 37/0435; B23K 37/0531;
(Continued)

(56) References Cited

U.S. PATENT DOCUMENTS 6,045,028 A     4/2000 Martin et al.
6,070,784 A *   6/2000 Holt ..................... B23K 20/126
                                                   228/112.1

(Continued)

FOREIGN PATENT DOCUMENTS

JP    H06-344140    12/1994
JP    H11-320127    11/1999
(Continued)

OTHER PUBLICATIONS

Thomas, W.M. et al., "The simultaneous use of two or more friction stir welding tools," TWI Global, published on the Internet (Jan. 1, 2005), XP055303730, http://www.twi-global.com, Jan. 2005.
(Continued)

*Primary Examiner* — Kiley Stoner
(74) *Attorney, Agent, or Firm* — Levy & Grandinetti

(57) ABSTRACT

A method of fabrication by friction stir welding (FSW) at an interface between adjoining components such as pipe lengths of a pipeline has layers of different metals on each side. FSW is performed from one side of the adjoining components by effecting relative movement of a first FSW tool along the interface. FSW is performed from an opposite side of the adjoining components by effecting relative movement of a second FSW tool along the interface. Advantageously, FSW is performed simultaneously from both sides of the adjoining components with the FSW tools applying loads in mutual opposition about the adjoining components.

20 Claims, 9 Drawing Sheets

(51) Int. Cl.
    *B23K 20/26*     (2006.01)
    *B23K 37/02*     (2006.01)
    *B23K 37/04*     (2006.01)
    *B23K 37/053*     (2006.01)
    *E21B 17/04*     (2006.01)
    *E21B 19/16*     (2006.01)
    *B23K 101/10*     (2006.01)
    *B23K 101/34*     (2006.01)

(52) U.S. Cl.
    CPC .............. *B23K 20/22* (2013.01); *B23K 20/26* (2013.01); *B23K 37/0276* (2013.01); *B23K 37/0282* (2013.01); *B23K 37/0435* (2013.01); *B23K 37/0531* (2013.01); *B23K 37/0533* (2013.01); *E21B 17/04* (2013.01); *E21B 19/16* (2013.01); *B23K 2201/10* (2013.01); *B23K 2201/34* (2013.01)

(58) Field of Classification Search
    CPC .... B23K 20/26; B23K 20/1245; B23K 20/22; B23K 20/126; B23K 2201/34; B23K 2201/10; B23K 20/123; B23K 20/1255; B23K 20/1235; B23K 20/122–20/129; E21B 17/04; E21B 19/16
    USPC ................................................ 228/2.1, 112.1
    See application file for complete search history.

(56) References Cited

U.S. PATENT DOCUMENTS

| | | | | |
|---|---|---|---|---|
| 6,364,197 | B1* | 4/2002 | Oelgoetz | B23K 20/122 228/112.1 |
| 8,141,764 | B1* | 3/2012 | Potter | B23K 20/122 228/2.1 |
| 2001/0038028 | A1* | 11/2001 | Iwashita | B23K 20/123 228/112.1 |
| 2002/0158109 | A1* | 10/2002 | Gendoh | B23K 20/123 228/112.1 |
| 2005/0035173 | A1* | 2/2005 | Steel | B23K 20/1235 228/2.1 |
| 2005/0082342 | A1 | 4/2005 | Babb et al. | |
| 2006/0260376 | A1* | 11/2006 | Osame | B21C 23/085 72/269 |
| 2008/0096038 | A1* | 4/2008 | Nagano | B23K 20/126 428/586 |
| 2008/0274383 | A1* | 11/2008 | Kanno | B23K 20/123 429/412 |
| 2008/0302539 | A1* | 12/2008 | Mallenahalli | B23K 20/1225 166/380 |
| 2009/0294514 | A1* | 12/2009 | Babb | B23K 20/126 228/112.1 |
| 2011/0127311 | A1* | 6/2011 | Peterson | B23K 20/126 228/2.1 |
| 2014/0217154 | A1* | 8/2014 | Obaditch | B23K 20/126 228/112.1 |
| 2016/0167161 | A1* | 6/2016 | Sato | B23K 20/1255 228/114.5 |
| 2017/0157720 | A1* | 6/2017 | Sato | B23P 6/04 |

FOREIGN PATENT DOCUMENTS

| | | |
|---|---|---|
| JP | 2011-255416 | 12/2011 |
| WO | WO 2014/120241 | 8/2014 |

OTHER PUBLICATIONS

Temple, P.I., "Types fo Discontinuities in Friction Stir Welds," in Welding Handbook, Ninth edition, vol. 3, Welding processes Part 2, Dec. 12, 2007, American Welding Society, p. 249.

* cited by examiner

FABRICATION OF PIPE STRINGS USING FRICTION STIR WELDING

This invention relates to the use of friction stir welding (FSW) when fabricating pipe strings for use in pipelines. Such pipelines may be for subsea use, as especially required in the offshore oil and gas industry.

FSW is a joining process performed between facing surfaces of adjoining clamped metal parts. The process may be performed at a butt joint or at an overlapping joint between the parts, although a butt joint is more relevant to pipeline fabrication. A specially-profiled probe, pin or tip protruding from the end of a rapidly-rotating tool is driven into and then traversed along the joint. The tool spins about an axis that is substantially perpendicular to the surface of the metal into which the probe is driven.

Friction between the rotating probe and the stationary parts generates heat and material viscosity such that the metal of the parts softens but does not melt. Whilst FSW is regarded as a substantially solid-state process, the metal of the abutting parts adjacent to the probe undergoes a temporary transformation into a plasticised state. When in that plasticised state, the metal experiences highly dynamic fluid flow driven by the spin of the probe.

Specifically, the rapid stirring action of the rotating probe intermixes the softened metal of the two parts along the region of their abutting interface. This intense deformation adds further heat to the metal. Simultaneously, mechanical forging pressure is applied by a shoulder of the tool around the probe to consolidate the weld region. The forging pressure exerted by the tool is resisted by a weld backing member that is positioned in opposition to the tool about the weld.

As the tool advances, plasticised metal is forced behind the probe and is left behind as the probe traverses further along the joint. Then, clamping force between the parts promotes consolidation of the weld before the plasticised metal cools and hardens.

A characteristic of FSW is that no filler metal is added between the parts. Also, the probe is a non-consumable item although it is, of course, subject to wear and replacement in extended use.

Upon metallurgical analysis, the following principal zones are evident in the cooled and hardened weld following FSW;
 a thermo-mechanically affected zone (TMAZ) that follows the path of the probe during welding, being the region that has been affected metallurgically by both temperature cycling and plastic deformation; and
 as in all welding processes, a heat-affected zone (HAZ) comprising base metal beside the welded joint that has been affected metallurgically by temperature cycling. The HAZ encompasses, and extends beyond, each side of the TMAZ; however, the portion of the HAZ outside the TMAZ has not deformed plastically during welding.

Together, the TMAZ and HAZ define a dynamic recrystallised zone, known in the art as the DXZ.

The TMAZ is slightly wider than the width of the probe and extends slightly deeper into the metal than the depth or length of the probe. The TMAZ may itself be divided to include a stir zone, being the central region of the most heavily-deformed material that most closely follows the path and width of the probe.

Following its invention, FSW gained acceptance quickly for use on metals with a low softening temperature such as aluminium alloys. Inexpensive tools made of hardened tool steels provide sufficient hardness and abrasion resistance for use with such metals. FSW has been used with such metals in the aerospace, marine and transportation industries for several years. However, it is only recently that tool materials and geometries have been devised to perform FSW on metals with a high softening temperature, such as steels.

Performing FSW on ferrous alloys such as steels—and indeed on many nonferrous alloys—requires a tool and especially a probe with the thermal stability to withstand temperatures of around 900 to 1200 Celsius. Achieving consistent welds at such high temperatures while achieving sufficient wear-resistance and mechanical strength under high loads places extraordinary demands on the tool.

The main mechanical forces that act on a rotating tool during FSW are as follows:
 a z-axis force toward the abutting metal parts, which is necessary to plunge the probe into the metal and to maintain the probe at an appropriate depth below the surface of the metal;
 an x-axis traverse force acting in a tool traverse direction aligned with the direction of tool motion along the joint, arising from resistance of the softened metal to that motion of the tool; and torque required to rotate the tool, which will depend on the z-axis force, friction between the probe and the metal of the parts being joined and the resistance of that metal, when softened, to flow around the probe when stirred by the probe.

An example of a tool for performing FSW on metals with a high softening temperature is offered by MegaStir Technologies LLC of Utah, USA. The tool comprises a shank of tungsten carbide that is held in a liquid-cooled tool holder to manage heat removal. A locking collar attaches a replaceable probe of polycrystalline cubic boron nitride to the shank so as to transmit torque from the shank to the probe during FSW.

FSW machines typically employ a thermocouple facing the probe to feed a temperature signal to a controller in use. The controller provides continuous, real-time temperature control, modifying tool rotation speed, tool traverse speed and optionally also 2-axis load as may be required to remain within a window of workpiece temperature and tool loads that is necessary to maintain steady-state FSW conditions. It is also important to prevent tool failure and to minimise wear and fatigue to the tool and the machinery that supports and drives the tool. As conditions that favour low tool loads may not favour high productivity and good weld properties, a suitable compromise may have to be reached.

Shielding gas is not necessarily required for FSW but, optionally, a gas shroud may be positioned around the tool to provide a flow of inert gas such as argon or carbon dioxide, if such gas is needed as a barrier to oxidation of the metal being welded during FSW.

US 2014/034710 to Brigham Young University and MegaStir Technologies LLC provides a brief overview of the art of FSW and describes the ongoing challenges of extending FSW to metals with a high softening temperature.

It is attractive to seek wider application for FSW because, in principle, the process is capable of producing a consistent, high-strength joint in a single welding pass while minimising post-process operations, FSW is safe, clean and promises exceptional repeatability. Particular advantages of FSW over traditional fusion-welding methods arise from avoiding problems associated with cooling from the liquid phase, notably redistribution of solutes, porosity and solidification cracking.

The present invention is particularly concerned with the problems that must be overcome if FSW is to be applied to the welding of bimetallic pipes lined with a corrosion-resistant alloy (CRA). CRA-lined pipes may, for example, be required in the offshore oil and gas industry to handle well fluids that contain corrosive agents such as hydrogen sulphide and chlorides. Such pipes may be used as flowlines or tie-ins on the seabed or as catenary risers extending upwardly from the seabed to a surface installation or to a riser support buoy that is tethered beneath the surface.

A rigid CRA-lined pipe for subsea use typically comprises a load-bearing, thick-walled, high-strength outer pipe of low-alloy carbon steel, lined with a thin-walled liner sleeve of a suitable CRA. The outer pipe resists buckling when the lined pipe is bent during laying, spooling or unspooling and resists thermal stresses and hydrostatic pressure when the pipe is underwater. Where the lined pipe is used as a catenary riser, the outer pipe also provides fatigue resistance. Conversely, the CRA liner provides little mechanical strength, being just a few millimeters thick, but it protects the outer pipe from corrosive constituents of fluids carried by the pipe in use.

The use of two different materials in this way recognises that a long pipe made entirely from corrosion-resistant material would be prohibitively expensive and yet could lack the essential mechanical properties that are provided by the strong outer wall of a lined pipe.

CRA-lined pipes take two forms; the invention is relevant to them both. The first form is 'clad' pipe, in which an internal CRA liner sleeve is metallurgically bonded to the outer pipe. The second form is 'mechanically lined pipe' or 'MLP', in which radial expansion by internal hydraulic pressure applied to a CRA liner sleeve effects a strong interference it between the liner sleeve and the outer pipe to fix the liner sleeve without metallurgical bonding. An example of MLP is supplied by H. Butting GmbH & Co. KG of Germany under the trade mark 'BuBi'.

Marine pipelaying techniques involving fabrication of a rigid pipeline on a vessel are generally categorised as either S-lay or J-lay, although variants and hybrids of those techniques have been proposed and used, such as 'steep S-lay'. J-lay operations will be used to exemplify the invention in the description that follows, as the invention has particular benefits in that context. However, the invention may have benefit in any operation in which CRA-lined pipe lengths are girth-welded end-to-end for subsea use, such as in S-lay operations, when fabricating pipes at a spoolbase for reel-lay operations, or when fabricating offshore tie-ins.

The invention is applicable to the following welding positions, which are determined by the pipe orientation and whether the pipe is fixed or turning about its longitudinal axis during welding:

for S-lay operations and for welding at spoolbases, with the pipe on a horizontal axis—the '5G' position if the pipe is fixed or the '1G' position if the pipe is turning;

for J-lay operations, with the pipe fixed on a vertical axis—the '2G' position; and for fabrication of offshore tie-ins, with the pipe fixed on an inclined axis between vertical and horizontal—the '6G' position.

'1G', '2G', '5G' and '6G' are globally-recognised expressions for those welding positions, as used by the American Welding Society (AWS).

Where the pipe is fixed, the invention contemplates FSW machines that orbit the pipe circumferentially along the butt joint. Where the pipe turns instead, an FSW machine may simply remain fixed beside the pipe in alignment with the butt joint. In either case, FSW can be performed irrespective of the orientation of the parts being joined because no liquid weld pool is formed. This is another reason why FSW is attractive to the subsea oil and gas industry.

In all cases involving fabrication on a vessel, the speed of pipelaying depends upon minimising the timescale of operations on the critical path. It is particularly important that welding, weld testing and field joint coating take no longer than is necessary. Any delays on the critical path can be hugely expensive as they tie up marine assets that cost hundreds of thousands of US dollars per day to operate. Delays may even risk abandonment of the pipelaying operation if sea conditions deteriorate before the pipeline is fully installed.

High-quality welds must be achieved consistently and as quickly as possible. In this respect, weld quality cannot be sacrificed for speed: a pipe string cannot be launched if it has any critical weld defects. Thus, the completed weld is examined by radiography and/or by Ultrasound techniques. Only after passing inspection can the weld be coated with a field joint coating and then launched into the sea as part of the pipe string.

Any unacceptable defect found upon inspection of a weld must be rectified either by repairing the defect or by cutting out the welded region and repeating the entire welding operation. Rectification of a defective weld takes such a long time that it inevitably impacts upon the critical path of pipelaying. So, everything possible must be done to prevent critical weld defects arising in the first instance.

Fabrication of pipe strings from CRA-lined pipe joints requires particularly close control of the fabrication process and involves much complexity. Using traditional welding techniques, the production rate for a CRA-lined pipeline is typically less than a quarter of the production rate of a plain carbon steel pipeline of the same dimensions.

Specifically, girth welds between CRA-lined pipe joints have traditionally been made by arc-welding processes, typically gas tungsten arc welding (GTAW) or gas metal arc welding (GMAW). GTAW and GMAW are practically difficult in marine yard or offshore conditions because a protective shelter with air and gas management systems has to be built around the joints during welding. This applies especially during welding of the CRA layer, which is exceptionally sensitive to gas composition.

Before welding, the ends of opposed pipe lengths must be bevelled or re-bevelled if necessary and thoroughly cleaned and dressed. The pipe lengths are then pulled together and aligned with an internal line-up clamp. The pipe lengths must be aligned accurately to ensure that the internal profile is as even as possible. The weld root gap between the bevels must also be set precisely.

In traditional welding methods, multiple welding passes are required and the weld region must be cleaned to bare metal between each pass to remove slag. In WO 2011/135349, for example, external and internal bevels define external and internal grooves between abutting lengths of CRA-lined pipe. Welding is performed initially from the external side using a carbon steel filler wire at the base of the external groove. One or more further external welding passes fill the external groove partially with carbon steel filler. Subsequently, the joint is welded from the internal CRA-lined side, using an internal welding machine to deposit a filler of CRA material at the base of the internal groove. One or more further fill passes on the internal side then fill the internal groove with CRA filler before the weld is completed from the external side using a carbon steel filler to fill the remaining space in the external groove in one or more final fill passes.

In WO 2011/087589, on the other hand, external welding heads perform an external weld pass on the root of a joint between abutting lengths of CRA-lined pipe, thereby forming a root weld which then cools and starts to solidify. While the external heads go on to perform fill passes to form higher external layers in an external groove between bevels, an internal welding head performs an internal weld pass on the root weld. This internal weld pass melts and flattens the inward side of the root weld deposited by the external welding apparatus, without using any additional filler material.

Recent developments in the FSW art have led to proposals to use FSW for butt-welding of pipe joints. For example, WO 20101074755 proposes butt welding of single-wall unlined pipes involving an FSW step. First, a root pass weld is performed inside a pipe by fusion welding to create a solid 'backing' root bead. Subsequently, FSW is used on the external side to complete the weld.

WO 2010/074755 proposes applying a root weld so as to avoid the complication of applying an internal backing member to the root area to support the joint during the subsequent FSW step. However, WO 2010/074755 acknowledges that this approach requires particularly careful design of the root weld geometry as there is a risk that the very large z-axis load applied through the FSW tool in use could cause the root area to collapse inwardly—namely, 'dropout'.

Also, there is no suggestion in WO 20101074755 of welding CRA-lined pipe. Indeed, WO 20101074755 teaches away from welding CRA-lined pipe because it proposes traditional gas fusion welding for the inner side of the pipe. Internal gas fusion welding is particularly problematic if that inner side is defined by a CRA lining, due to the sensitivity of CRA to gas composition during welding as mentioned above.

The aforementioned MegaStir Technologies LLC is offering orbital FSW machines that are said to be capable of welding pipe whose outer diameter is from 12 inches to 60 inches (about 305 mm to about 1520 mm). However, those machines have no capability to weld CRA-lined pipe, whose layers have markedly different metallurgical properties and therefore require different welding conditions. For example, CRA may need a higher welding temperature than carbon steel. Also, FSW performed through the full thickness of a CRA-lined pipe would result in excessive mixing of material between the CRA and carbon steel layers. This could undermine the essential properties of each layer—respectively, corrosion-resistance and strength.

JP 2011255416 teaches the use of FSW to weld dad steel, although in that case the steel is apparently a thin panel rather than a thick-walled pipe. There, FSW is used to weld the cladding layer and part of the steel layer from one side, with the support of a suitable backing member against the other side. Then, the welded parts are turned over and a groove between edges of the steel layer on the other side is filled by arc welding.

Again, the teaching of JP 2011255416 is to use traditional welding for a significant part of the welding process even if FSW is also used. Strong mechanical backing is needed for FSW. Also, as FSW does not add material, it is not usable where a wide bevel groove necessary for arc welding of thick-walled steel is provided on one side of the workpiece.

It is against this background that the present invention has been devised.

In one sense, the invention resides in a method of fabricating a pipeline by butt welding at a circumferential interface between components comprising lengths of pipe disposed end-to-end or between a length of pipe and a pipeline accessory at least one of which components comprises internal and external layers of different metal separated by a boundary. The method of the invention comprises: performing external friction stir welding (FSW) by effecting relative circumferential movement along the interface of an inwardly-facing external FSW tool positioned outside the pipe, which tool spins about a first axis that is substantially radial with respect to a cross-section of the pipe; and performing internal FSW by effecting relative circumferential movement along the interface of an outwardly-facing internal FSW tool positioned inside the pipe, which tool spins about a second axis that is substantially radial with respect to the cross-section of the pipe; wherein thermo-mechanically affected zones (TMAZs) produced by the external FSW tool and the internal FSW tool each extend partially through a wall of the pipe, and wherein the TMAZ produced by the external FSW tool contacts, intersects or overlaps the TMAZ produced by the internal FSW tool; and wherein the TMAZs produced by the external FSW tool and the internal FSW tool have depths that extend to or overlap slightly beyond the boundary between the internal and external layers.

The method may comprise inserting an internal line up clamp (ILUC) supporting an outwardly-facing internal FSW tool through an interior of the pipeline length until it bridges abutting ends of the pipe lengths, or abutting ends of the pipe length and the pipeline accessory, so as to position the outwardly-facing internal FSW tool inside the pipe in alignment with the circumferential interface, the outwardly-facing internal FSW tool being rotatable with respect to the ILUC The method may comprise turning the outwardly-facing internal FSW tool around a longitudinal axis of the ILUC to effect relative circumferential movement of the outwardly-facing internal FSW tool along the interface. To this end, the ILUC may comprise at least two clamping mechanisms and a spine member and the method may comprise turning the FSW tool about or with the spine member to effect relative circumferential movement of the outwardly-facing internal FSW tool along the interface.

The method may comprise bracing the outwardly-facing internal FSW tool against z-axis forces while performing internal FSW by providing a roller support that extends radially from the outwardly-facing internal FSW towards the opposite internal wall of the pipe.

It is highly advantageous for external FSW and internal FSW to be performed simultaneously, with the first and second axes substantially in mutual alignment and with the external FSW tool and the internal FSW tool applying loads along those axes in mutual opposition about a wall of the pipe. Another approach is for the external FSW and internal FSW to be performed simultaneously but with the first and second axes substantially offset so that loads applied by the external FSW tool and the internal FSW tool in mutual opposition about a wall of the pipe balance each other when both of those tools move with respect to the pipe.

Preferably, the external FSW tool and the internal FSW tool are moved in coordination circumferentially relative to the pipe while performing FSW. Nevertheless, radial load and spin speed of the external FSW tool and the internal FSW tool may be controlled individually while performing FSW.

In another approach, external FSW and internal FSW may be performed sequentially in either order, although it is preferred that external FSW is performed before internal FSW.

Where external FSW and internal FSW are performed sequentially in either order, the method of the invention may additionally comprise applying an internal back-up member to an internal surface of the pipe in alignment with the first axis during external FSW and applying an external back-up member to an external surface of the pipe in alignment with the second axis during internal FSW. Conveniently, the internal back-up member may be positioned against the internal surface of the pipe by radially-outward movement of the member from an internal line-up clamp that is positioned between the lengths of pipe to bridge the interface.

Conversely, the external back-up member may be applied to the external surface of the pipe by the application of radially-inward clamping force to the pipe. For example, the external back-up member may be applied to the external surface of the pipe by applying a back-up ring extending around the interface.

In summary, the invention provides a method to weld internally-lined steel pipe comprising performing internal FSW using an internal welding machine and performing external FSW. The internal and external FSW operations are preferably simultaneous to avoid the use of separate backing members, to compensate for mechanical loads on the pipes and the welding heads and to balance temperature.

By welding from inside and outside by FSW as per the invention, a narrower bevel is possible or there may be no need for a bevel at all. Consequently, FSW can be used to weld the parts completely.

The invention allows a homogeneous and overmatching weld in the carbon steel layer and bridging of the CRA layer of a CRA-lined pipe, without intermixing the two materials beyond specification.

In order that the invention may be more readily understood, reference will now be made, by way of example, to the accompanying drawings in which.

Figure 4:
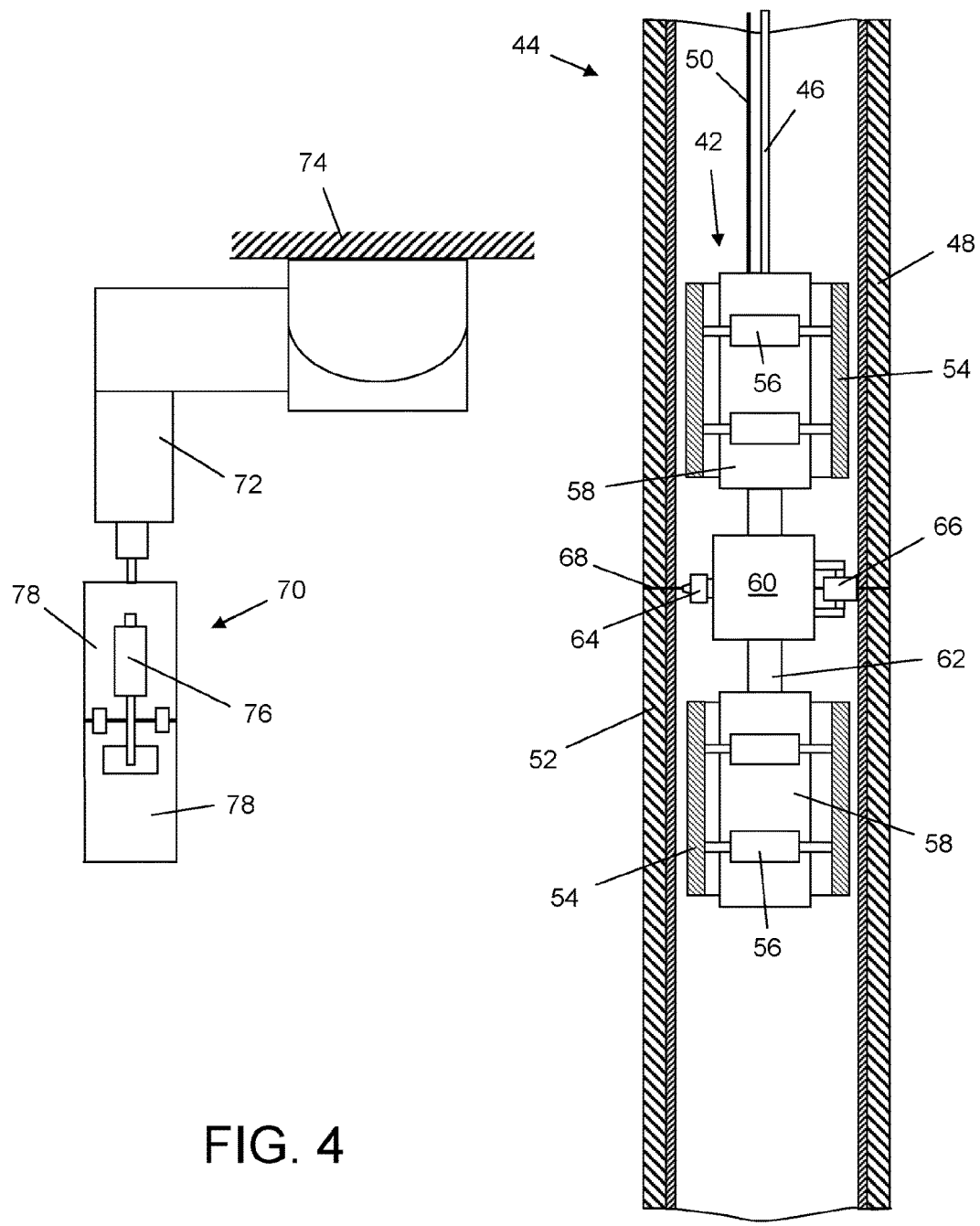
FIG. 4 is a schematic sectional side view of an internal line-up clamp lowered into an upright CRA-lined carbon steel pipe during a J-lay operation, the clamp supporting an internal FSW machine that is arranged to weld the CRA layer from within the pipe in accordance with the invention, this view also showing an external back-up ring in a retracted position beside the pipe.
Figure 5:
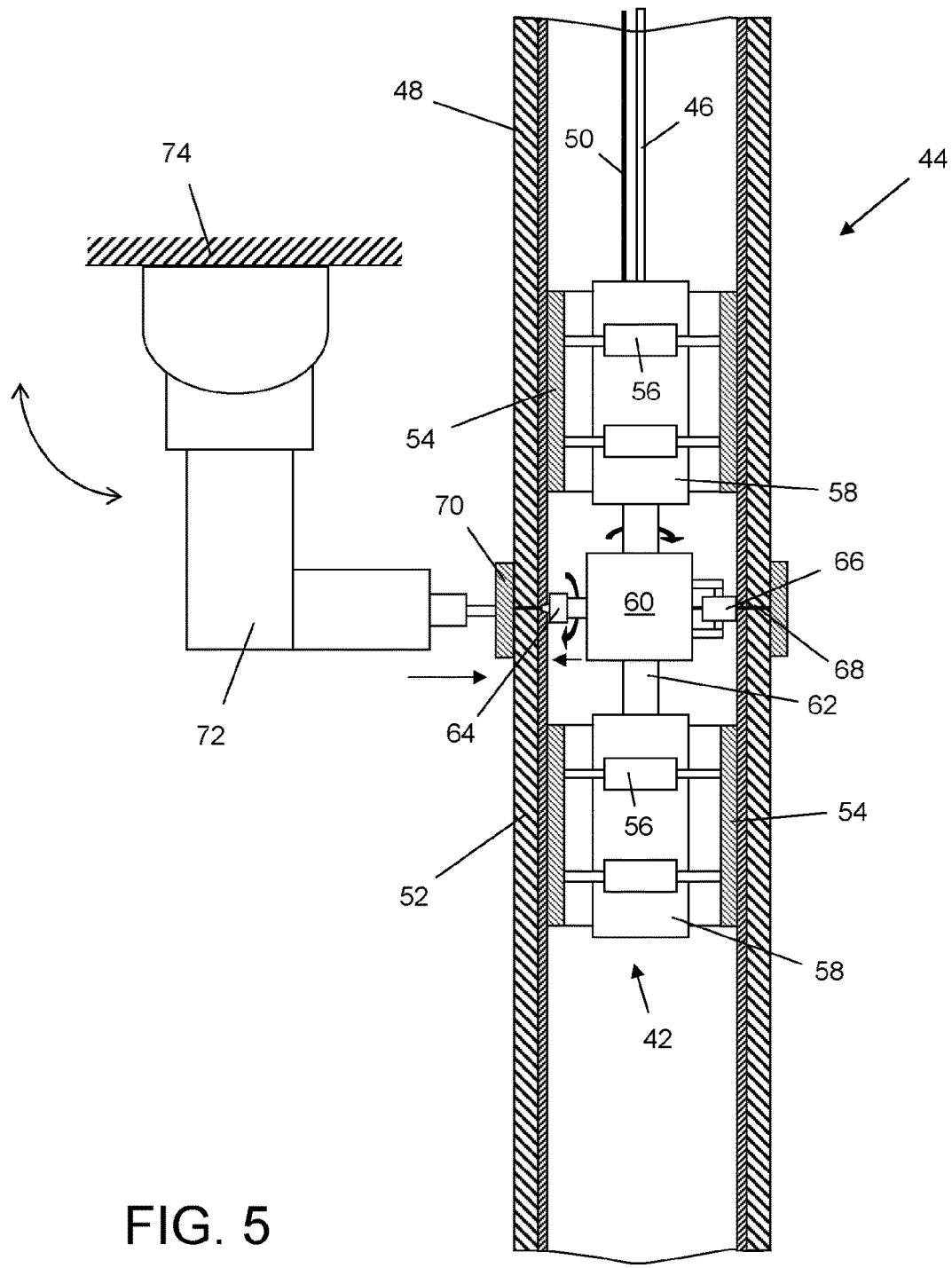
Figure 6:
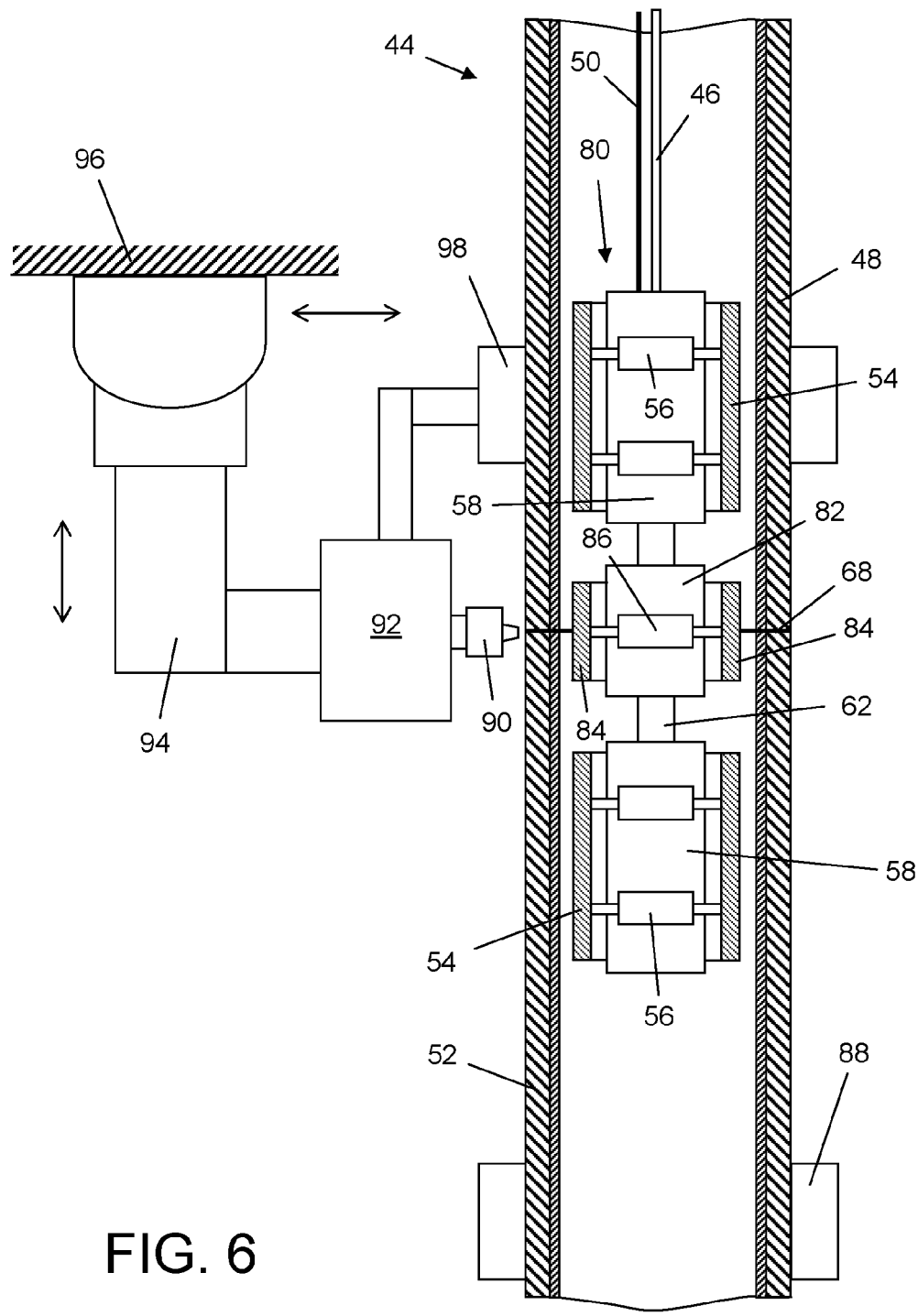
Figure 7:
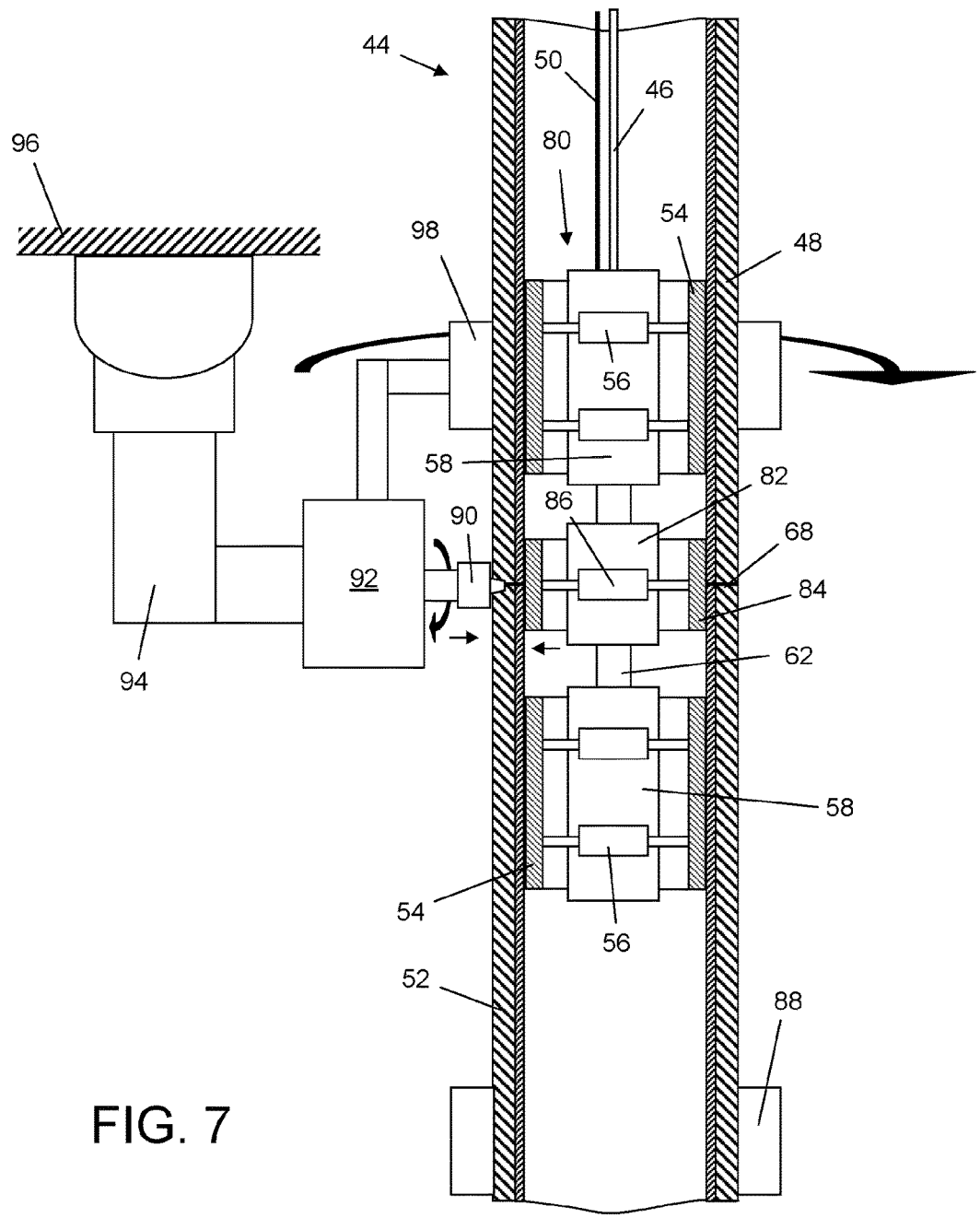
Figure 8:
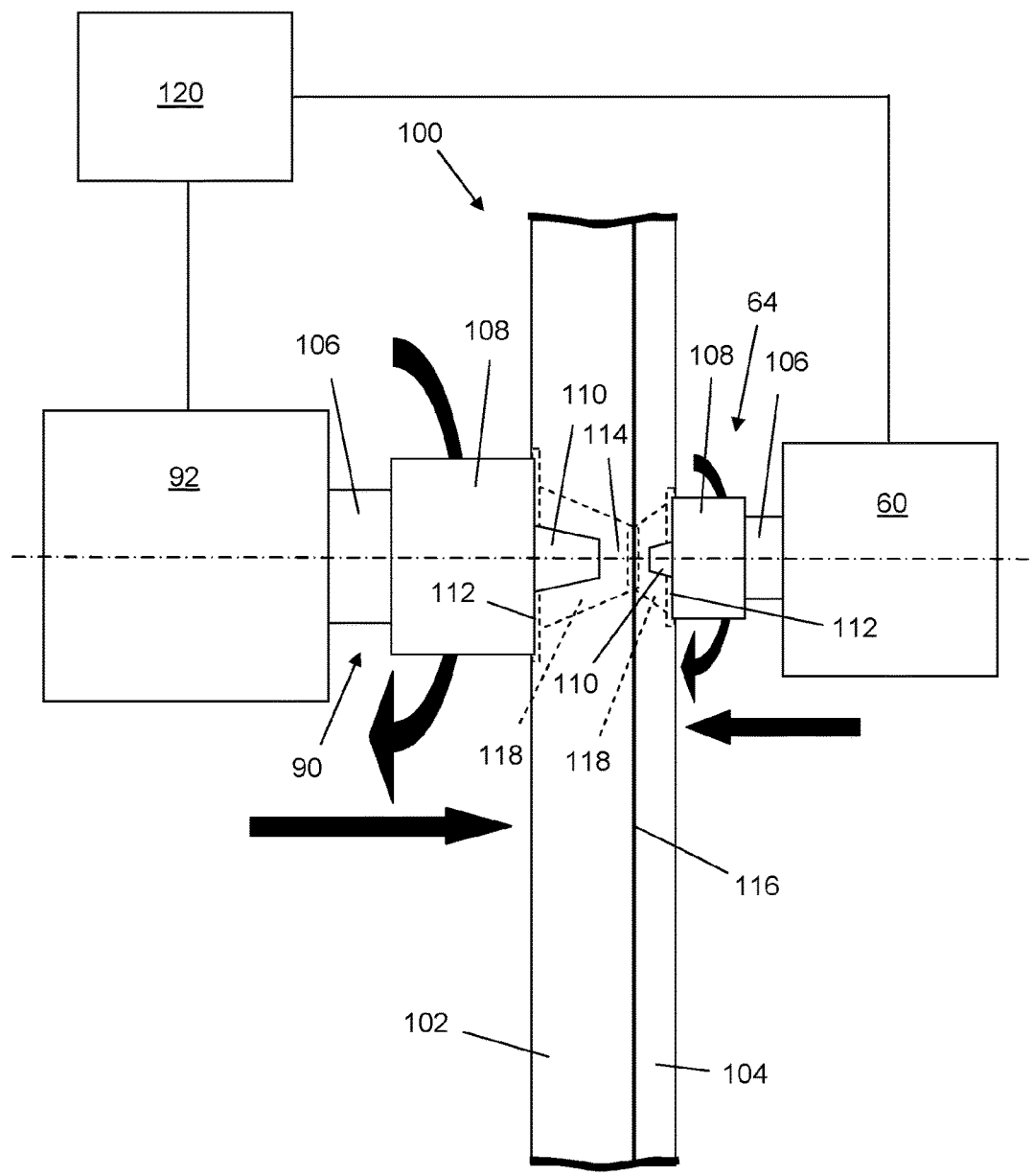
Figure 9:
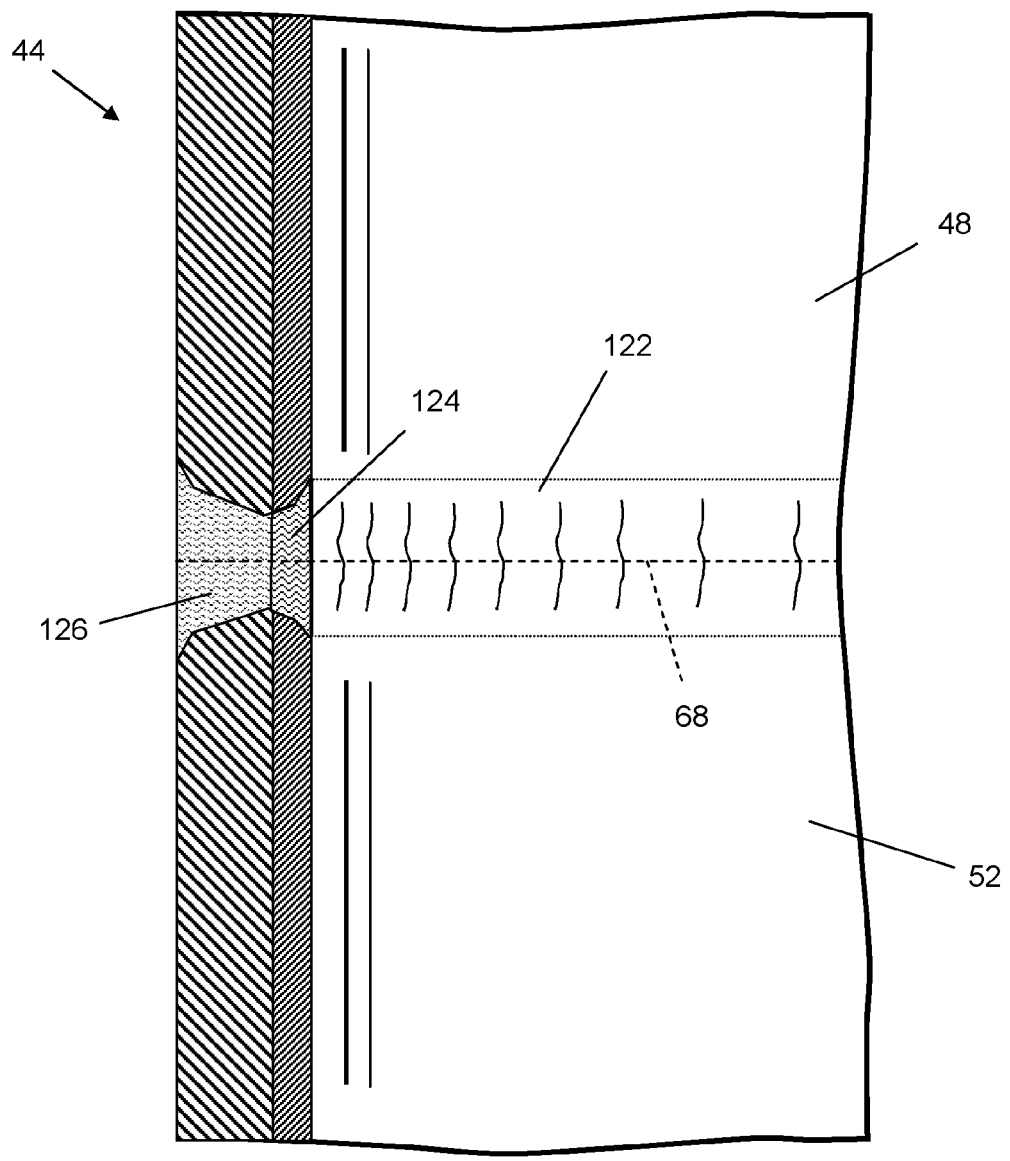

FIG. 5 corresponds to FIG. 4 and shows the external back-up ring in a deployed position around a butt joint between adjoining lengths of the pipe, with the pipe clamp engaged with the inside of the pipe and the FSW machine performing a weld around the inside of the pipe along the butt joint;

FIG. 6 is a schematic sectional side view of an internal line-up clamp lowered into an upright CRA-lined pipe during a J-lay operation, the clamp in this case supporting an internal back-up ring shown here in a retracted position inside the pipe in alignment with a butt joint between adjoining lengths of the pipe, this view also showing an external FSW machine in accordance with the invention that is in a deployed position and is clamped to the pipe in readiness for welding;

FIG. 7 corresponds to FIG. 6 and shows the pipe clamp and the internal back-up ring engaged with the inside of the pipe and the FSW machine performing a weld along the butt joint while moving around the outside of the pipe;

FIG. 8 is a schematic enlarged cross-sectional view of a wall of the CRA-lined pipe being welded simultaneously from the inside using an internal FSW machine like that shown in FIGS. 4 and 5 and from the outside using an external FSW machine like that shown in FIGS. 6 and 7, the rotating welding tools of the FSW machines being in opposition about the wall; and FIG. 9 corresponds to FIG. 6 and shows a weld in a wall of a CRA-lined pipe after all welding tools have been withdrawn and welding has been completed.

Figure 1:
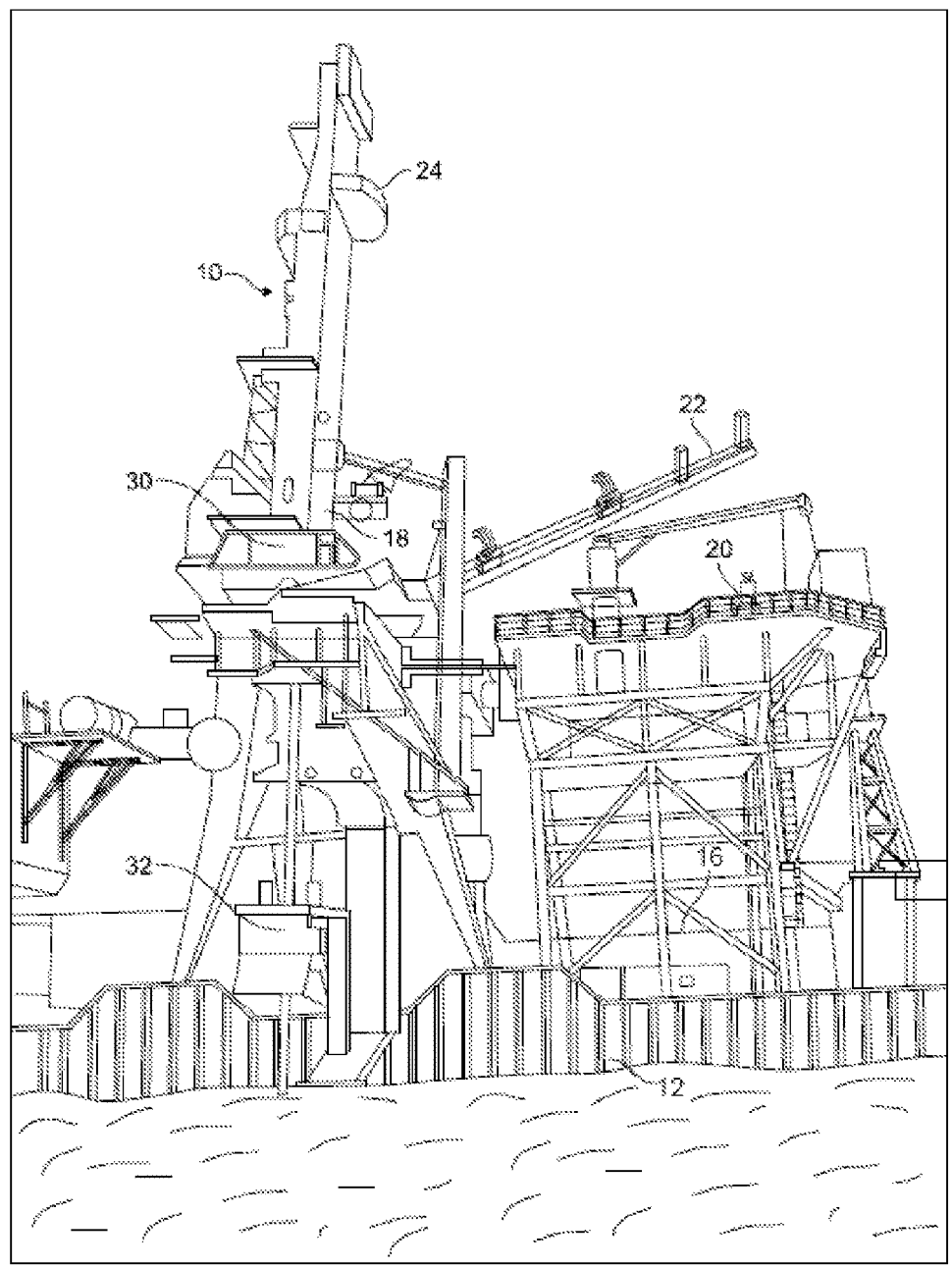
FIG. 1 is a perspective view from near see level of a J-Lay tower on a barge, to illustrate the prior at background.

An example of a J-lay system is found on the Applicant's pipe lay vessel Seven Borealis. To put the invention into its context of use, the operation of Seven Borealis during J-lay pipelaying will firstly be described with reference to FIGS. 1 to 3 of the drawings. This J-lay example does not limit the scope of the invention, whose wider applicability has already been explained.

The J-lay tower 10 of the barge 12 is supplied with pipe joints 14 fabricated onshore, which are stored horizontally on the deck 16. In this example, the pipe joints 14 are double joints although triple- or quad-joints could be used if a J-lay tower 10 is tall enough.

Figure 2:
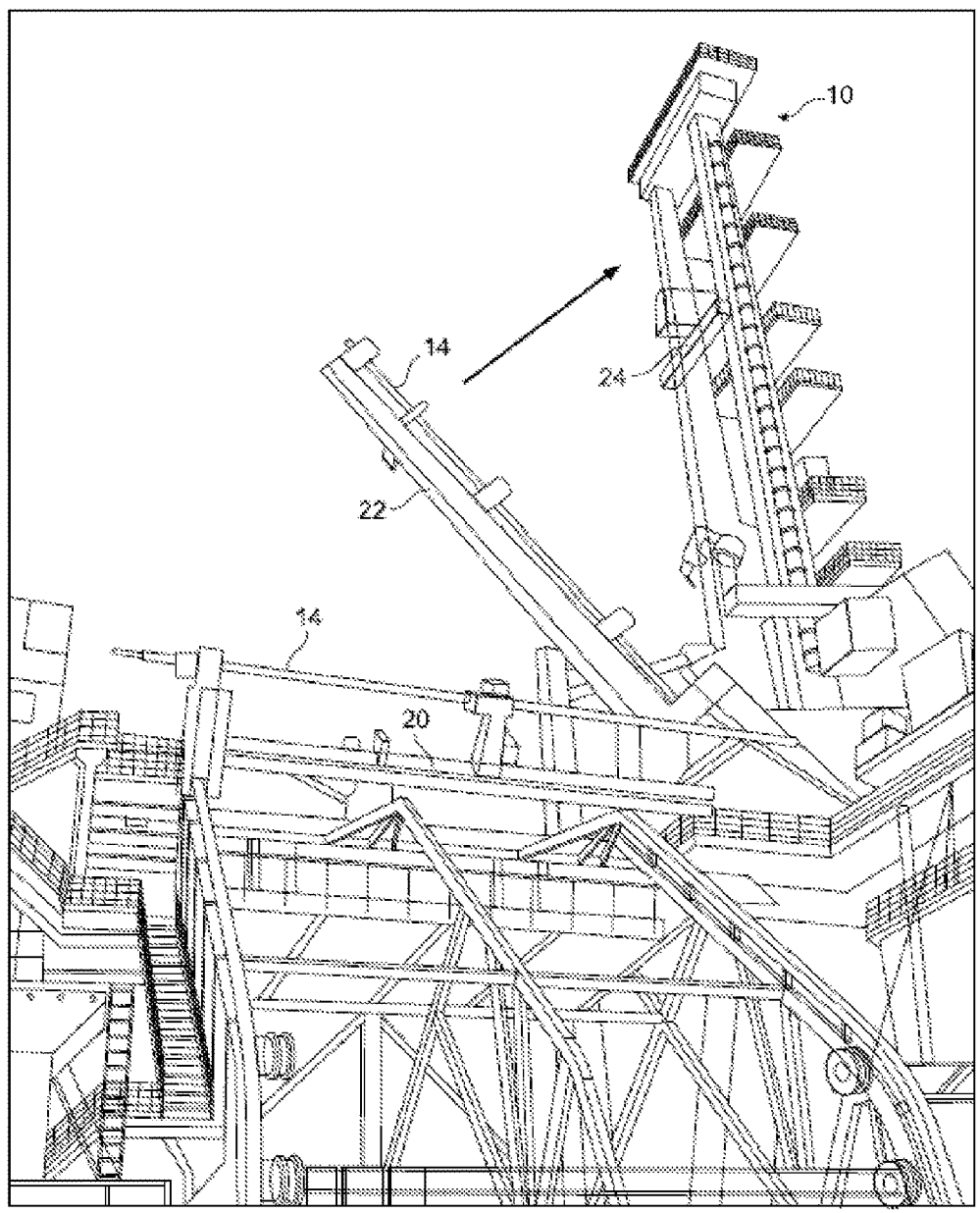
FIG. 2 is a perspective view of an erector arm loading a double joint into the tower of FIG. 1.

As required, the pipe joints 14 are lifted successively in horizontal orientation from the deck 16 to a tower entry level 18 using a pipe elevator system 20 best shown in FIG. 2. Here, a pipe joint 14 is loaded into a pivoting erector arm 22 which upends the pipe joint 14 into an upright orientation and passes it over to a tower handling system comprising a tensioner 24. The pipe joint 14 is then lowered down and aligned with the pipeline end 26 held in a support bushing 28 (see FIG. 3) at a first work station 30 on the tower 10.

The pipe joint 14 is welded to the pipeline end 20 at the first work station 30 before the load of the pipe string is transferred to the tensioner 24 near the top of the J-lay tower 10. The completed pipe string is then lowered down to the support bushing 28 for the addition of the next pipe joint 14. The tensioner 24 and the support bushing 28 alternate to grip the pipeline end, interacting in a so-called 'hand-over-hand' manner.

As the pipe string is lowered, a field joint coating is applied to the welded joint at a second work station 32 suspended from the tower 10 below the first work station 30. The weld can be inspected at either or both of these two work stations 30, 32.

Figure 3:
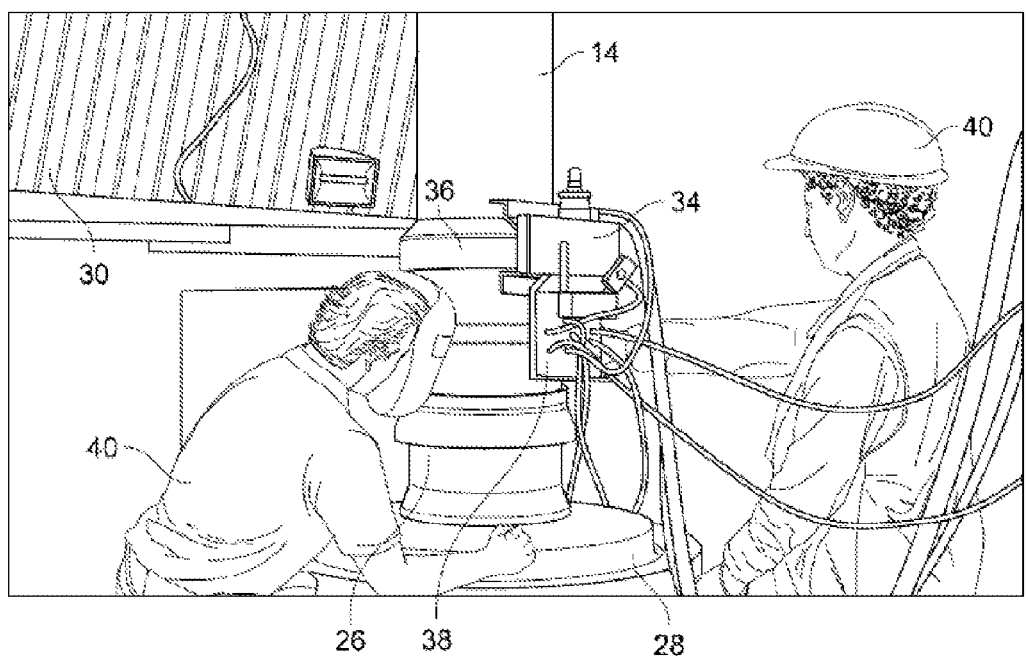
FIG. 3 is a perspective view of a welding operation taking place at a welding station in the tower of FIG. 1.

As shown in FIG. 3, welding is performed by one or more automatic welding bugs 34 that are driven around the pipe string on a track or guide band 36 fixed on the pipe joint 14 being welded to the pipeline end 26 below. The or each bug 34 moves circumferentially around the pipe string so that one or more welding heads 38 carried by the bug 34 can run a weld bead within a groove defined between the pipe joint 14 and the pipeline end 26.

Each welding bug 34 requires services including power, data connections, shielding gas and welding wire to be fed continuously to the welding heads 38 during welding. Platforms such as annular turntables at each work station 30, 32 enable pipeline workers 40 such as welders and supervisors to weld, inspect and coat the pipe string in the J-lay tower 10. The turntables provides working platforms for the pipeline workers 40 who control and observe the welding operation and may also support equipment required for the welding operation and for related processes such as weld inspection.

With reference now to FIGS. 4 and 5 to introduce the invention, an internal line-up clamp or ILUC 42 is fitted inside a pipe 44 shown here held upright as in a J-lay tower. However the J-lay tower and associated equipment such as the aforementioned support bushing have been omitted from this schematic view for clarity.

The ILUC 42 is suspended on a winch cable 46 that extends down from the open end of the upper pipe length 48. An umbilical 50 also extends down to the ILUC 42 from the open end of the upper pipe length 48 to provide hydraulic, pneumatic and/or electrical power to the ILUC 42.

The main function of the ILUC 42 is to maintain alignment between, and to locate, the adjoining ends of upper and lower pipe lengths 48, 52 during a butt-welding operation. To do so, the ILUC 42 has pneumatically- or hydraulically-operated clamping devices exemplified here by shoes 54 driven radially by actuators 56. The shoes 54 are distributed angularly about a central longitudinal axis of the ILUC 42 and act radially outwardly to bear against the internal surfaces of the adjoining pipe lengths 48, 52.

The ILUC 42 shown in FIGS. 4 and 5 comprises three sections, namely: two longitudinally-spaced clamping mechanisms 58 that include the shoes 54 and actuators 56; and an internal FSW machine 60 that is positioned longitudinally centrally between the clamping mechanisms 58. The FSW machine 60 is supported in this example by a central spine member 62 that rigidly joins the clamping mechanisms 58.

In operation, the FSW machine 60 turns around the central longitudinal axis of the ILUC 42, which axis coincides with the central longitudinal axis of the pipe 44. To achieve this, the FSW machine 60 can turn around the spine member 62, if the spine member 62 is fixed, or can turn with the spine member 62, if the spine member 62 can itself turn relative to the clamping mechanisms 58.

A rotary welding tool 64 extends on a radial axis from one side of the FSW machine 60 toward the internal wall of the pipe 44. The tool 64 can be retracted or advanced along the radial axis with respect to the FSW machine 60 and is driven by a motor in the FSW machine 60 to spin at high speed about that radial axis.

A roller support 66 extends radially from the other side of the FSW machine 60 toward the internal wall of the pipe 44. The roller support 66 braces the FSW machine 60 against high z-axis forces applied radially to the tool 64 when the tool 64 is advanced in use into the internal wall of the pipe 44.

In use, the ILUC 42 is lowered through the interior of the upper pipe length 48 until it bridges the abutting ends of the pipe lengths 48, 52 and the rotary welding tool 64 is aligned with the circumferential interface 68 between the pipe lengths 48, 52. At that interface 68, the pipe lengths 48, 52 butt against each other end-to-end with little or no gap. Nor is there a need for a bevel defining an external groove. This is unlike the arc welding arrangements of the prior art, which are much prolonged by the fill passes required to fill the groove after a root pass has been performed at the base of the groove. However, a narrow bevel is possible if that happens to assist a particular FSW operation.

Initially the shoes 54 are retracted for insertion of the ILUC 42 into the pipe 44 as shown in FIG. 4. Final alignment and adjustment is made before the ILUC locks both pipe lengths against relative movement. Locking is achieved by deploying the shoes 54 radially outwardly to lock the ILUC 42 relative to the pipe 44 as shown in FIG. 5. This resists relative movement between the pipe lengths 48, 52 and also the torque reaction from the FSW machine 60 as it turns about the central longitudinal axis of the ILUC 42 during an FSW operation to traverse the rotary welding tool 64 along the interface 68 between the pipe lengths 48, 52.

As an FSW operation applies high 2-axis loads through the rotary welding tool 64, an external back-up ring 70 is supported beside the pipe 44 to resist those loads and so to prevent outward radial deformation or deflection of the pipe 44. FIG. 4 shows the back-up ring 70 in a retracted or stowed position away from the deployment axis of the pipe 44, whereas FIG. 5 shows the back-up ring 70 in a deployed position around the interface 68 between the pipe lengths 48, 52.

The back-up ring 70 is supported by a pivot arm 72 that is pivotally attached to a foundation structure 74. That foundation structure 74 may, for example, be a part of the J-lay tower. The pivot arm 72 can swing the back-up ring 70 between the retracted position of FIG. 4 and the deployed position of FIG. 5. FIG. 4 also shows an actuator mechanism 76 that can open hinged jaws 78 of the back-up ring 70 and close the jaws 78 around the pipe 44, as shown in FIG. 5, when the back-up ring 70 is deployed in readiness for an FSW operation.

Moving on now to FIGS. 6 and 7, these show the components and movements that are involved in a corresponding external FSW operation performed from outside the pipe 44. External FSW may be performed either after or before internal FSW in the examples shown in FIGS. 4 to 7. The side requiring lower temperature (generally the external side) may preferably be welded first as it reduces cool-down time of the interface between layers of the pipe wall. However, it will be explained below with reference to FIG. 8 how internal FSW and external FSW may be performed simultaneously and that this has significant advantages.

The ILUC 80 shown in FIGS. 6 and 7 is broadly similar to the ILUC 42 of FIGS. 4 and 5; like numerals are used for like parts. However the ILUC 80 differs in having an internal back-up mechanism 82 positioned on the spine member 82 between the clamping mechanisms 58 instead of the internal FSW machine 60 of the ILUC 42.

The internal back-up mechanism 82 comprises back-up ring segments 84 driven radially by actuators 88. Initially the ring segments 84, like the shoes 54 of the clamping mechanisms 58, are retracted radially inwardly for insertion of the ILUC 80 into the pipe 44 as shown in FIG. 6. When the shoes 54 have been deployed radially outwardly to lock the ILUC 80 relative to the pipe 44, the ring segments 84 are also deployed radially outwardly as shown in FIG. 7 to apply back-up force against the inner wall of the pipe 44 in alignment with the circumferential interface 68 between the pipe lengths 48, 52. The pipe length 52 is also held locally by a pipe support 88 in the welding station, for example a clamp or a bushing.

The back-up force applied via the ring segments 84 resists high z-axis loads applied through a rotary welding tool 90 that faces radially inwardly from an external FSW machine 92, so as to prevent inward radial deformation or deflection of the pipe 44 during an FSW operation. Again, the tool 90 can be retracted or advanced along the radial axis with respect to the FSW machine 92 and is driven by a motor in the FSW machine 92 to spin at high speed about that radial axis.

The external FSW machine 92 is supported beside the pipe 44 by a pivot arm 94 that is pivotally attached to a foundation structure 96. That foundation structure 98 may, for example, be a part of the J-lay tower; it may also be a turntable mounted to the tower to turn around the pipe 44. As noted above, it is well known in J-lay operations for a turntable not only to provide a working platform for welding operatives but also to support equipment that is required for a welding operation.

Via the external FSW machine 92, the pivot arm 94 also supports a clamp ring 98 that encircles the pipe 44. Like the back-up ring 70 shown in FIGS. 4 and 5, the clamp ring 98 suitably comprises hinged jaws that can be opened and closed around the pipe 44. Once the clamp ring 95 is closed around the pipe 44 in this way, the rotary welding tool 90 of the external FSW machine 92 can be advanced into engagement with the exterior of the pipe 44 in line with the interface 68 between the pipe lengths 48, 52 so that the external FSW operation can begin.

The clamp ring 98 and the pivot arm 94 cooperate to locate the external FSW machine 92 against reaction forces during the FSW operation. One of those reaction forces arises as the external FSW machine 92 turns about the pipe 44 to traverse the rotary welding tool 90 along the interface 68. Another reaction force is a torque reaction that arises as the rotary welding tool 90 turns relative to the pipe 44. For resisting these forces, the clamp ring 98 and the pivot arm 94 supplement each other's strength and so those individual components may be made less bulky, which is an advantage where space is limited beside the pipe 44. By gripping the lower length 52 of the pipe 44, the pipe support 88 also participates in locating the FSW machine 92 that is clamped to the pipe 44.

In some arrangements, the clamp ring 98 may grip the pipe 44 tightly to serve as a along which the external FSW machine 92 can be driven around the pipe 44 to traverse the rotary welding tool 90 along the interface 88. In other arrangements, the clamp ring 98 may slide around the pipe 44 to enable the external FSW machine 92 to be driven around the pipe 44 by another drive means, such as the aforementioned turntable. The clamp ring 98 may be applied to a coating of the pipe 44 via pads or jacks, or directly to an uncoated outer surface of the pipe 44.

The arrangements described provide for accurate and safe positioning of welding equipment within the limited space of an offshore welding station and reduces the bare pipe end length that is required for clamping that equipment to the pipe 44. There is no need for an electrical earth connection on the pipe 44.

Although not shown in FIGS. 6 and 7, the pivot arm 94 can swing the external FSW machine 92 and the clamp ring 98 between the deployed position shown in FIGS. 6 and 7 and a retracted or stowed position away from the deployment axis of the pipe 44.

As will be explained below in detail with reference to FIG. 8, the welding tool 90 of the external FSW machine 92 and the welding tool 64 of the internal FSW machine 60 each leave a respective thermo-mechanically affected zone (TMAZ) after the respective FSW operations. To recap, a TMAZ is a region that has been affected metallurgically by both temperature cycling and plastic deformation, in particular stirring. Each TMAZ extends part-way through the wall of the pipe 44. As FIG. 8 explains, the inwardly-extending TMAZ of the external welding operation preferably touches or overlaps slightly with the outwardly-extending TMAZ of the internal welding operation. This touching or overlap between the TMAZs is possible whether the FSW operations are sequential, as in FIGS. 4 to 7, or simultaneous, as in FIG. 8.

Using separate FSW machines 60, 92 with their associated welding tools 64, 90 for the different sides of the workpiece as shown in FIGS. 4 to 8 allows welding conditions to be optimised for the different metals being welded. Such optimisation is not possible if FSW is performed with a single welding tool from only one side of the workpiece as in the prior art, FSW performed from two sides also helps to extend the benefits of FSW to thicker workpieces, where previously tool strength and the forces experienced during FSW operations have been limiting factors.

Having thus described how the invention enables internal FSW and external FSW operations to be performed sequentially if desired, it is possible now to explain how internal FSW and external FSW operations could instead be performed simultaneously if preferred. In particular, the ILUC 42 of FIGS. 4 and 5 that is equipped with the internal FSW machine 60 can be used with the external FSW machine 92 of FIGS. 6 and 7. In that way, the pipe 44 can be welded internally and externally at the same time by the respective FSW machines 60 and 92.

In this respect, reference is now made to FIG. 8 of the drawings, in which the rotary welding tool 90 of the external FSW machine 92 and the rotary welding tool 64 of the internal FSW machine 60 are both shown. Specifically, the welding tools 64 and 90 are shown in opposition about a layered bimetallic wall 100 of the pipe 44.

The wall 100 comprises a carbon steel outer part 102 and an inner CRA liner 104, whose thickness relative to the outer part 102 is exaggerated here for the sake of clarity. An upper section of the wall 100 is part of the upper pipe length 48 and a lower section of the wall 100 is part of the lower pipe length 52. The tools 64 and 90 are axially aligned with the interface 68 between the upper and lower pipe lengths 48, 52, their shared longitudinal axis being radial with respect to the pipe 44 and hence orthogonal with respect to the wall 100.

The rotary welding tools 64 and 90 are rotationally symmetrical about their shared central longitudinal axis. Distal ends of the tools 64 and 90 face each other in alignment on that axis, about which the tools 64 and 90 spin during an FSW operation.

Each of the tools 64 and 90 comprises a shank 106, a probe holder 108 at a distal end of the shank 106 and a probe 110 protruding distally from the probe holder 108. The probe holder 108 defines a shoulder 112 around the probe 110 to exert inward forging pressure on the softened metal during an FSW operation. The tools 64 and 90 rotate in the same sense in FIG. 8 but they could possibly contra-rotate in other embodiments of the invention.

Each probe 110 has a frusto-conical shape that tapers distally. The probe 110 of the welding tool 64 of the internal FSW machine 60 is shorter axially than the probe 110 of the welding tool 90 of the external FSW machine 92, to suit the thin CRA liner 104 on the inside of the pipe 44 relative to the much thicker outer carbon steel part 102 on the outside of the pipe 44.

FIG. 8 shows the spinning probes 110 of the rotary welding tools 64 and 90 plunged into the CRA liner 104 and the outer part 102 of the wall 100 respectively. The tips of the probes 110 face each other but do not touch, leaving a gap 114 between them at the interface 68 between the upper and lower pipe lengths 48, 52.

In the example of FIG. 8, the tips of the probes 110 do not cross over the boundary 116 between the liner 104 and the outer part 102 into the opposite layer of the wall 100. This controls mixing between the CRA of the liner 104 and the carbon steel of the outer part 102 during an FSW operation. However, it is possible that one of the probes 110 could cross over that boundary 116 if greater mixing between layers of the wall 100 is to be encouraged.

Dashed lines show the TMAZs 118 around the probes 110 where the heat of friction and stirring deformation has softened, deformed and consolidated the metal of the upper and lower pipe lengths 48, 52 to effect a weld between them. The TMAZs 118 extend around the frusto-conical side walls of the probes 110 and also distally beyond the tips of the probes 110. It will be apparent that despite the gap 114 between the tips of the probes 110, both of the TMAZs 118 extend distally to an extent sufficient to bridge that gap 114 by touching or overlapping with each other.

The shoulders 112 of the probe holders 108 bear against the liner 104 and the outer part 102 to limit insertion of the probes 110 and to apply forging pressure to the softened metal in the TMAZs 118. Forging pressure may also be applied by forcing together the upper and lower pipe lengths 48, 52 at their interface 68, for example using a suitably-adapted ILUC to apply longitudinal traction to the pipe lengths 48, 52. In any event, using an ILUC to clamp the upper and lower pipe lengths 48, 52 against separation under thermal expansion will serve to maintain inward pressure on the TMAZs 118, as will the self-weight of the upper pipe length 48 if it is allowed to rest on the lower pipe length 52.

FIG. 8 also shows that the internal FSW machine 60 and the external FSW machine 92 are both connected to a controller 120 for central coordinated control. Control is applied to the machines 60, 92 themselves and also in a wider sense to relative movement between the machines 60, 92 and the pipe 44. The controller 120 may take various inputs in known fashion, such as a workpiece temperature signal from a thermocouple or a tool stress signal from a strain sensor. The controller 120 may generate various control outputs in response to those inputs and also in response to operator commands.

Some control outputs of the controller 120 may be synchronised between the FSW machines 60, 92, such as a command to advance both of the rotary tools 64 and 90 into contact with the pipe 44 ready for an FSW operation to begin, or to disengage both of the rotary tools 64 and 90 from the pipe 44 and to stop rotating when an FSW operation has ended. Of course, to maintain effective backing-up involving each FSW machine 60, 92 pushing against the other through their respective welding tools 64, 90. It is also important to maintain synchronization between the traverse movements of the rotary welding tools 64 and 90 along the interface 68 between the upper and lower pipe lengths 48, 52.

Other control outputs of the controller 120 should, however, be specific to the different FSW machines 60, 92. For example, each machine 60, 92 requires individual monitoring and control adjustments for parameters such as tool rotation speed, tool traverse speed and z-axis load. Also, the machines 60, 92 operate in quite different conditions; in particular, different materials being welded, different rates of heat dissipation, and different rotary welding tools 64 and 90.

Simultaneous internal and external FSW as shown in FIG. 8 has various advantages. It produces a high-quality weld in a single pass while maintaining conditions that are optimal for the different metals being welded. It improves consistency of welding between layers or from two sides. It obviates separate back-up equipment such as an external back-up ring and associated operations such as deploying, inserting or positioning that equipment. It also avoids the delay of a second welding operation after the first welding operation, whether that operation is internal FSW or external FSW as the case may be.

FIG. 9 shows, in cross-section, a weld 122 that results from use of the FSW apparatus of the invention. This is a simplified schematic view of the weld 122; in reality, the boundaries will be less distinct. The effect of the TMAZs 110 of FIG. 8 is shown but the wider HAZ has been omitted. It is apparent that the region around the interface 88 that previously existed between the Upper and lower pipe lengths 48, 52, now shown as a dashed line, has been extensively disrupted and tightly consolidated. It is also apparent that the internal structure of the weld 122 has considerable and beneficial homogeneity between the CRA liner 104 and the carbon steel outer part 102. Yet, the weld 122 retains a distinct inner region 124 that is predominantly CRA and a distinct outer region 126 that is predominantly carbon steel, with limited mixing of the different metals between those layers. This ensures that the weld 122 does not disrupt the essential functions of the CRA liner 104 and the carbon steel outer part 102: namely, corrosion-resistance and strength respectively.

Variations are possible within the inventive concept. For example, in welding arrangements that involve a turning pipe rather than a fixed pipe—notably the horizontal '1G' position that may be used for S-lay and spoolbase operations—the welding equipment may be fixed because the pipe moves instead. In that case, rotation of the pipe determines traverse movement of the welding tools along a butt joint.

In its broadest sense, the invention may be applied to workpieces that are not pipes and even to workplaces that are not curved, such as flat plates. However, the invention has particular benefits in relation to pipes as it solves weld-backing problems that are particularly suffered when fabricating pipe strings and when welding accessories to such pipe strings. It is also possible for the invention to be applied to workpieces that have different layer structures or compositions, in other words, not necessarily with a CRA layer. However, the invention has particular benefits for the fabrication of bimetallic, CRA-lined assemblies, which may for example include vessels and tanks that will contain corrosive fluids in use. The invention may also be applied to thick workpieces, not necessarily layered, whose thickness could otherwise preclude an FSW operation being performed traditionally from one side.

The principles of the invention may be applied to friction stir processing as opposed to FSW. Friction stir processing may, for example, be employed to remove defects in a joint already made, whether by FSW, fusion welding or otherwise.

The invention claimed is:

1. A method of fabricating a pipeline by butt welding at a circumferential interface between components comprising lengths of pipe disposed end-to-end or between a length of pipe and a pipeline accessory, at least one of which components comprises internal and external layers of different metal separated by a boundary comprises:
   performing external friction stir welding (FSW) by effecting relative circumferential movement along the interface of an inwardly-facing external FSW tool positioned outside the pipe, which tool spins about a first axis that is substantially radial with respect to a cross-section of the pipe; and
   performing internal FSW by effecting relative circumferential movement along the interface of the outwardly-facing internal FSW tool, which tool spins about a second axis that is substantially radial with respect to the cross-section of the pipe;
   wherein thermo-mechanically affected zones (TMAZs) produced by the external FSW tool and the internal FSW tool each extend partially through a wall of the pipe; wherein the TMAZ produced by the external FSW tool contacts, intersects or overlaps the TMAZ produced by the internal FSW tool; and wherein the TMAZs produced by the external FSW tool and the internal FSW tool have depths that extend to or overlap beyond the boundary between the internal and external layers.

2. The method of claim 1, comprising inserting an internal line up clamp (ILUC) supporting an outwardly-facing internal FSW tool through an interior of the pipeline length until it bridges abutting ends of the pipe lengths, or abutting ends of the pipe length and the pipeline accessory, so as to position the outwardly-facing internal FSW tool inside the pipe in alignment with the circumferential interface, the outwardly-facing internal FSW tool being rotatable with respect to the ILUC.

3. The method of claim 2, comprising turning the outwardly-facing internal FSW tool around a longitudinal axis of the ILUC to effect relative circumferential movement of the outwardly-facing internal FSW tool along the interface.

4. The method of claim 3, wherein the ILUC comprises at least two clamping mechanisms and a spine member and wherein the method comprises turning the FSW tool about or with the spine member to effect relative circumferential movement of the outwardly-facing internal FSW tool along the interface.

5. The method of claim 2, comprising bracing the outwardly-facing internal FSW tool against z-axis forces while performing internal FSW by providing a roller support that extends radially from the outwardly-facing internal FSW towards the opposite internal wall of the pipe.

6. The method of claim 1, wherein external FSW and internal FSW are performed simultaneously, with the first and second axes substantially in mutual alignment and with the external FSW tool and the internal FSW tool applying loads along those axes in mutual opposition about a wall of the pipe.

7. The method of claim 1, wherein external FSW and internal FSW are performed simultaneously, with the first and second axes substantially offset so that loads applied by the external FSW tool and the internal FSW tool in mutual opposition about a wall of the pipe balance each other when both of those tools move with respect to the pipe.

8. The method of claim 1, wherein the external FSW tool and the internal FSW tool are moved in coordination circumferentially relative to the pipe while performing FSW.

9. The method of claim 1, wherein radial load and spin speed of the external FSW tool and the internal FSW tool are controlled individually while performing FSW.

10. The method of claim 1, wherein external FSW and internal FSW are performed sequentially in either order.

11. The method of claim 10, wherein external FSW is performed before internal FSW.

12. The method of claim 10, further comprising:
applying an internal back-up member to an internal surface of the pipe in alignment with the first axis during external FSW; and
applying an external back-up member to an external surface of the pipe in alignment with the second axis during internal FSW.

13. The method of claim 12, wherein the internal back-up member is positioned against the internal surface of the pipe by radially-outward movement of the member from an internal line-up clamp that is positioned between the lengths of pipe to bridge the interface.

14. The method of claim 12, wherein the external back-up member is applied to the external surface of the pipe by the application of radially-inward clamping force to the pipe.

15. The method of claim 12, wherein the external back-up member is applied to the external surface of the pipe by applying a back-up ring extending around the interface.

16. The method of claim 3, comprising bracing the outwardly-facing internal FSW tool against z-axis forces while performing internal FSW by providing a roller support that extends radially from the outwardly-facing internal FSW towards the opposite internal wall of the pipe.

17. The method of claim 16, wherein external FSW and internal FSW are performed simultaneously, with the first and second axes substantially in mutual alignment and with the external FSW tool and the internal FSW tool applying loads along those axes in mutual opposition about a wall of the pipe.

18. The method of claim 17, wherein external FSW and internal FSW are performed simultaneously, with the first and second axes substantially offset so that loads applied by the external FSW tool and the internal FSW tool in mutual opposition about a wall of the pipe balance each other when both of those tools move with respect to the pipe.

19. The method of claim 18, wherein the external FSW tool and the internal FSW tool are moved in coordination circumferentially relative to the pipe while performing FSW.

20. The method of claim 19, wherein radial load and spin speed of the external FSW tool and the internal FSW tool are controlled individually while performing FSW.

* * * * *